(12) United States Patent
Claussen et al.

(10) Patent No.: US 9,775,283 B2
(45) Date of Patent: Oct. 3, 2017

(54) METERING APPARATUS

(71) Applicant: Claussen Technology, LLC, Naples, FL (US)

(72) Inventors: Steven W. Claussen, Glenwood, MN (US); Erik Julian Nelson, Minneapolis, MN (US); Matthew Rust, Hudson, WI (US)

(73) Assignee: CLAUSSEN TECHNOLOGY, LLC, Naples, FL (US)

( * ) Notice: Subject to any disclaimer, the term of this patent is extended or adjusted under 35 U.S.C. 154(b) by 69 days.

(21) Appl. No.: 14/862,115

(22) Filed: Sep. 22, 2015

(65) Prior Publication Data

US 2016/0083202 A1    Mar. 24, 2016

Related U.S. Application Data

(60) Provisional application No. 62/053,637, filed on Sep. 22, 2014.

(51) Int. Cl.
| | | |
|---|---|---|
| *G01F 11/20* | (2006.01) | |
| *A01C 15/00* | (2006.01) | |
| *A01C 7/16* | (2006.01) | |

(52) U.S. Cl.
CPC .............. *A01C 15/006* (2013.01); *A01C 7/16* (2013.01)

(58) Field of Classification Search
CPC ....... A01C 15/005; A01C 15/006; A01C 7/16; B65G 65/46; B65G 65/463; B65G 37/00

USPC ....... 222/412, 413, 305–308, 367, 390, 333, 222/489

See application file for complete search history.

(56) References Cited

U.S. PATENT DOCUMENTS

| | | | | |
|---|---|---|---|---|
| 2,517,456 | A * | 8/1950 | Wherrett | B01F 7/243 366/102 |
| 3,913,343 | A * | 10/1975 | Rowland | F25C 5/002 222/241 |
| 6,039,220 | A * | 3/2000 | Jablonski | G01F 13/005 222/146.6 |
| 6,431,414 | B2 * | 8/2002 | Jaleel | B67D 1/06 222/146.6 |
| 2011/0049190 | A1 * | 3/2011 | Sevcik | F25C 5/002 222/236 |

FOREIGN PATENT DOCUMENTS

WO    WO 2014/144345    9/2014

* cited by examiner

*Primary Examiner* — Lien Ngo
(74) *Attorney, Agent, or Firm* — Mueting, Raasch & Gebhardt, P.A.

(57) ABSTRACT

A metering apparatus may be configured to control flow of material from a reservoir to control the amount of material applied, dispensed, and/or spread to a field while a vehicle traverses the field. The metering apparatus may include an auger portion located in an elevator channel to control the flow of material out of a reservoir opening of the reservoir.

33 Claims, 7 Drawing Sheets

METERING APPARATUS

This application claims the benefit of U.S. Provisional Patent Application Ser. No. 62/053,637 filed on Sep. 22, 2014, which is incorporated by reference herein in its entirety.

The present disclosure relates to metering apparatus for use in material transfer (e.g., transfer of granulated materials, etc.). For example, the apparatus may be coupled to a reservoir holding material to control the flow, or transfer, of material from the reservoir.

Agricultural vehicles may use dispensing apparatus to apply various materials to fields. The dispensing apparatus may include reservoirs, or hoppers, for holding the various materials (e.g., granular materials, etc.) such as, but limited to, e.g., seed, fertilizer, herbicides, pesticides or insecticides, any combination thereof, etc.

SUMMARY

The present disclosure describes exemplary apparatus and systems for use in material transfer. One exemplary system may include a container for holding material, a reservoir also for holding material, a coupler apparatus for coupling the container to the reservoir to transfer material therebetween, and metering apparatus coupled to an exit opening of the reservoir. The metering apparatus may be configured to control the flow of material from the reservoir to dispensing apparatus to be dispensed, or spread, across a field. The metering apparatus may include an auger portion located within an elevator channel. The auger portion may be rotated at a selected rate to control the flow of material through the elevator channel and out of the reservoir. The elevator channel may be described as extending from at least one intake opening to at least one discharge opening. The at least one discharge opening may be configured with various apparatus to inhibit flow of material from the discharge opening when the auger portion is stationary. Further, the at least one intake opening may be configured with various apparatus to inhibit flow of material from the reservoir into the at least one intake opening when one or more portions of the metering apparatus, such as, e.g., a motor portion, a bracket portion, the auger portion, etc. are removed, or decoupled, from the remainder of the metering apparatus (e.g., for cleaning, removing clogs, maintenance service, etc.). The exemplary metering apparatus may further include computing apparatus operatively coupled to the motor apparatus to control the rotational rate of the auger portion to control flow of material from the metering apparatus.

One exemplary metering apparatus for use with a reservoir holding material may include a housing portion, an auger portion, and a motor apparatus. The housing portion may include, or define, a lower region couplable to a reservoir and an upper region. The housing portion may further defines an elevator channel extending from one or more intake openings proximate the lower region to a discharge opening proximate the upper region and a discharge chute configured to receive material from the discharge opening and to direct the material outside of the reservoir. The auger portion may be located within the elevator channel and configured to selectively move material from the one or more intake openings through the elevator channel to the discharge opening. The motor apparatus may be operatively coupled to the auger portion and configured to rotate the auger portion to move material from the one or more intake openings through the elevator channel to the discharge opening to be discharged through the discharge chute.

In one or more embodiments, the metering apparatus may further include a restriction portion configured to inhibit flow of material from the elevator channel through the discharge opening to the discharge chute when the auger portion is stationary and to allow flow of material from the elevator channel through the discharge opening to the discharge chute when the auger portion is rotated to move material from the one or more intake openings to the discharge opening to be discharged through the discharge chute. The restriction portion may be biased towards the discharge opening to inhibit flow of material from the elevator channel through the discharge opening to the discharge chute when the auger portion is stationary. Further, the restriction portion may be conical extending from a point, and the point of the restriction portion may be located within the discharge opening proximate the auger portion.

In one or more embodiments, the metering apparatus may further include a gate portion configured to selectively inhibit flow of material from the reservoir through the one or more intake openings into the elevator channel. Further, the metering apparatus may further include a bracket portion couplable to the lower region of the housing portion. The gate portion may inhibits flow of material from the reservoir through the one or more intake openings into the elevator channel when the bracket portion is removed from the lower region of the housing portion and may allow flow of material from the reservoir through the one or more intake openings into the elevator channel when the bracket portion is coupled to the lower region of the housing portion. In at least one embodiment, the gate portion may be biased away from the upper region of the housing.

In one or more embodiments, the housing portion may be configured to locate the discharge opening and the one or more intake openings inside the reservoir when the housing portion is coupled to the reservoir. Further, the motor apparatus may be configured to be located outside of the reservoir when the housing portion is coupled to the reservoir. Still further, the motor apparatus may be configured to selectively control the rate of flow of material from the reservoir to be discharged through the discharge chute. Yet still further, the metering apparatus may further include a computing apparatus operably coupled to the motor apparatus to control the rate of flow of material from the reservoir to be discharged through the discharge chute.

In one or more embodiments, the elevator channel and the auger portion are aligned along an axis. In one or more embodiments, the lower region of the housing portion may include a funnel region configured to direct material form the reservoir into the one or more intake openings.

One exemplary material transfer system may include a reservoir and a metering apparatus. The reservoir may define an interior cavity configured to hold material and a reservoir opening extending into the interior cavity. The metering apparatus may be at least partially positionable within the reservoir opening and configured to control the flow of material from the reservoir. The metering apparatus may include a housing portion and an auger portion. The housing portion may include a lower region couplable to the reservoir and an upper region. Further, the housing portion may define an elevator channel extending from at least one intake opening proximate the lower region to a discharge opening proximate the upper region and a discharge chute configured to receive material from the discharge opening and to direct the material outside of the interior cavity of the reservoir.

The auger portion may be located within the elevator channel and may be configured to move material from the at least one intake opening through the elevator channel to the discharge opening.

In or more embodiments, the metering apparatus may further include a restriction portion configured to inhibit flow of material from the elevator channel through the discharge opening to the discharge chute when the auger portion is stationary and to allow flow of material from the elevator channel through the discharge opening to the discharge chute when the auger portion is rotated to move material from the at least one intake opening to the discharge opening to be discharged through the discharge chute.

In one or more embodiments, the metering apparatus may further include a gate portion configured to selectively inhibit flow of material from the interior cavity of the reservoir through the at least one intake opening into the elevator channel. In one or more embodiments, the housing portion may be configured to locate the discharge opening and the at least one intake opening inside the reservoir when the lower region of the housing portion is coupled to the reservoir. In one or more embodiments, the metering apparatus may further include a motor apparatus operatively coupled to the auger portion and configured to rotate the auger portion to move material from the at least one intake opening through the elevator channel to the discharge opening to be discharged through the discharge chute. Further, the motor apparatus may be configured to selectively control the rate of flow of material from the reservoir to be discharged through the discharge chute. Still further, the metering apparatus may further include computing apparatus operably coupled to the motor apparatus to control the rate of flow of material from the interior cavity of the reservoir to be discharged through the discharge chute.

The above summary is not intended to describe each embodiment or every implementation of the present disclosure. A more complete understanding will become apparent and appreciated by referring to the following detailed description and claims taken in conjunction with the accompanying drawings.

DETAILED DESCRIPTION OF EXEMPLARY EMBODIMENTS

In the following detailed description of illustrative embodiments, reference is made to the accompanying figures of the drawings which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary apparatus, systems, and methods shall be described with reference to FIGS. 1-7. It will be apparent to one skilled in the art that elements from one embodiment may be used in combination with elements of the other embodiments, and that the possible embodiments of such apparatus, systems, and methods using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

Figure 1:
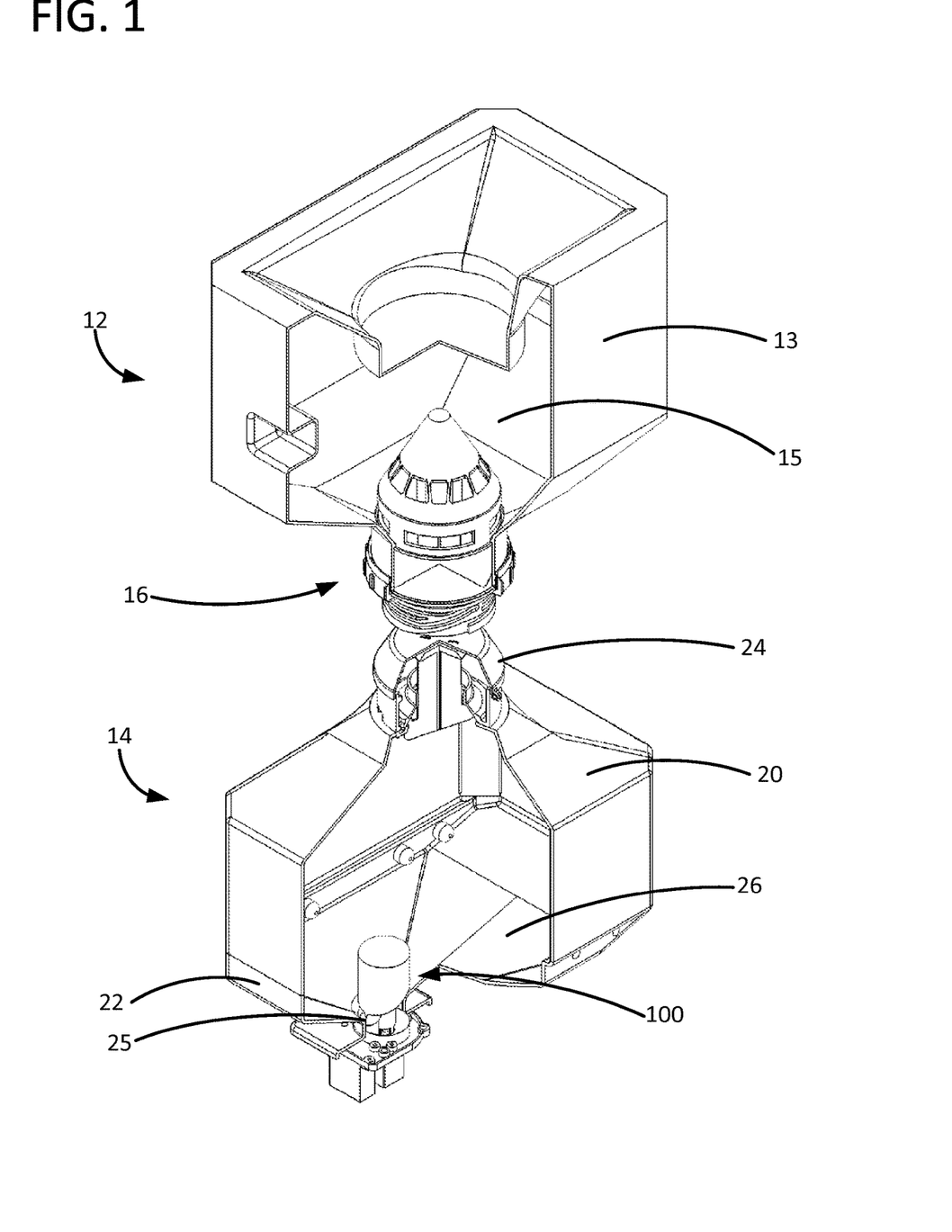
FIG. 1 is a perspective, cutaway view of an exemplary material transfer system.

An exemplary material transfer system 10 configured to transfer material from a container 12 to a reservoir 14 is depicted in FIG. 1. The material transfer system 10 may include a reservoir 14 for holding material (e.g., a bulk container for containing material), a container 12 for holding material (e.g., a container for containing material that may be emptied into reservoir), and a coupler apparatus 16 (e.g., a separate removable apparatus) configured to couple the container 12 to the reservoir 14 to allow material to flow from the container 12 to the reservoir 14 through a channel of the coupler apparatus 16 (e.g., without allowing the material to be dispersed or leaked into the environment). Each of the reservoir 14 and the container 12 may define an enclosure, cavity, or volume, for holding material. The material may include (e.g., granular materials, etc.) such as, but not limited to, e.g., see, fertilizer, herbicides, pesticides or insecticides, combinations thereof, etc.

The reservoir 14 may be coupled (e.g., fixedly coupled) to exemplary metering apparatus 100, which may be coupled to dispensing apparatus of a vehicle such as, e.g., tractor or implement attached thereto, that is configured to apply, dispense, and/or spread the material to a field while the vehicle traverses the field. The reservoir 14 may act as a storage vessel or tank for the material while the material is being dispensed by the dispensing apparatus.

The reservoir 14 may be shaped and/or sized in various manners and the present disclosure is not limited to the particular shaped and sized reservoirs presented herein. As shown in FIG. 1, the reservoir 14 defines a box-like shape including a pyramidal upper region 20 and a pyramidal lower region 22. The box-like shape defines an interior cavity 26 within which the material (e.g., granular materials, etc.) may be stored before dispensing using dispensing apparatus. Valve apparatus 24 may be located proximate the upper region 20 (e.g., coupled to the upper region). The valve apparatus 24 may generally be in a closed configuration such that the cavity 26 of the reservoir 14 remains enclosed, or sealed shut, but may be opened when engaged by the coupler apparatus 16. For example, valve apparatus 24 may be spring biased into a closed position and may be configured to automatically open when the coupler apparatus 16 is coupled to the valve apparatus 24 of the reservoir 14. When uncoupling the coupler apparatus 16 from the reservoir 14 and the valve apparatus 24, the valve apparatus 24 may automatically close. Further description of exemplary coupler apparatus 16 may be found in PCT Patent Application Pub No. WO 2014/144345 A1 published on Sep. 18, 2014 and entitled "APPARATUS, SYSTEMS, AND METHODS FOR MATERIAL TRANSFER," which may be incorporated herein by reference in its entirety.

The lower region 22 may taper towards a reservoir, or exit, opening 25 configured to be coupled to the exemplary metering apparatus 100 so as to deliver, or transfer, material from interior, or inside, cavity 26 of the reservoir 14 to the metering apparatus 100, which, in turn, will deliver, or transfer, the material to dispensing apparatus. The tapered, pyramidal shape of the lower region 22 may assist in material being directed to the reservoir opening 25 such that all the material located in the interior cavity 26 of the reservoir 14 may be delivered to the metering apparatus 100. The reservoir 14 may define one or more apertures (e.g., mounting holes) to couple the reservoir 14 to the metering apparatus 100 and/or dispensing apparatus. Further, the reservoir 14 may define one or more apertures (e.g., mounting holes) to couple the reservoir 14 to a vehicle, or implement, such as, e.g., a tractor or planter, that is configured to apply, dispense, and/or spread the material to a field while the vehicle traverses the field.

Similar to the reservoir 14, the container 12 may be shaped and/or sized in various manners and the present disclosure is not limited to the particular shaped and sized containers presented herein. Generally, the container 12 may be described as including include a body 13 defining a cavity 15 configured to hold material and an opening 17 extending into the cavity 15. Exemplary reservoirs, containers, and coupler apparatus may be further described in PCT Patent Application Pub No. WO 2014/144345 A1 published on Sep. 18, 2014 and entitled "APPARATUS, SYSTEMS, AND METHODS FOR MATERIAL TRANSFER," which may be incorporated herein by reference in its entirety.

The exemplary metering apparatus 100 may be configured to control the flow of material from the reservoir 14 to outside of the reservoir 14 (e.g., through the reservoir opening 25), e.g., to dispensing apparatus, which may dispense or spread the material onto a field. The metering apparatus 100 may include a housing portion 102 extending from a lower, or first, region 110 to an upper, or second, region 112. Further, the metering apparatus 100 may at least partially be located in the reservoir opening 25 to receive material from the reservoir 14. In other words, a portion of the metering apparatus 100, such as, e.g., a portion of the lower region 110 of the housing portion 102 may be located in the reservoir opening 25. Further, one or more portions or regions of the metering apparatus 100 may be located within the interior space 26 of the reservoir. The housing portion 102 may be described as "plugging" or "blocking" the reservoir opening 25 such that material located in the interior cavity 26 of the reservoir 14 will pass through the housing portion 102 of the metering apparatus 100 to exit the reservoir through the reservoir opening 25. As shown, at least a part of the lower region 110 of the housing portion 102 is located in the reservoir opening 25.

Figure 5:
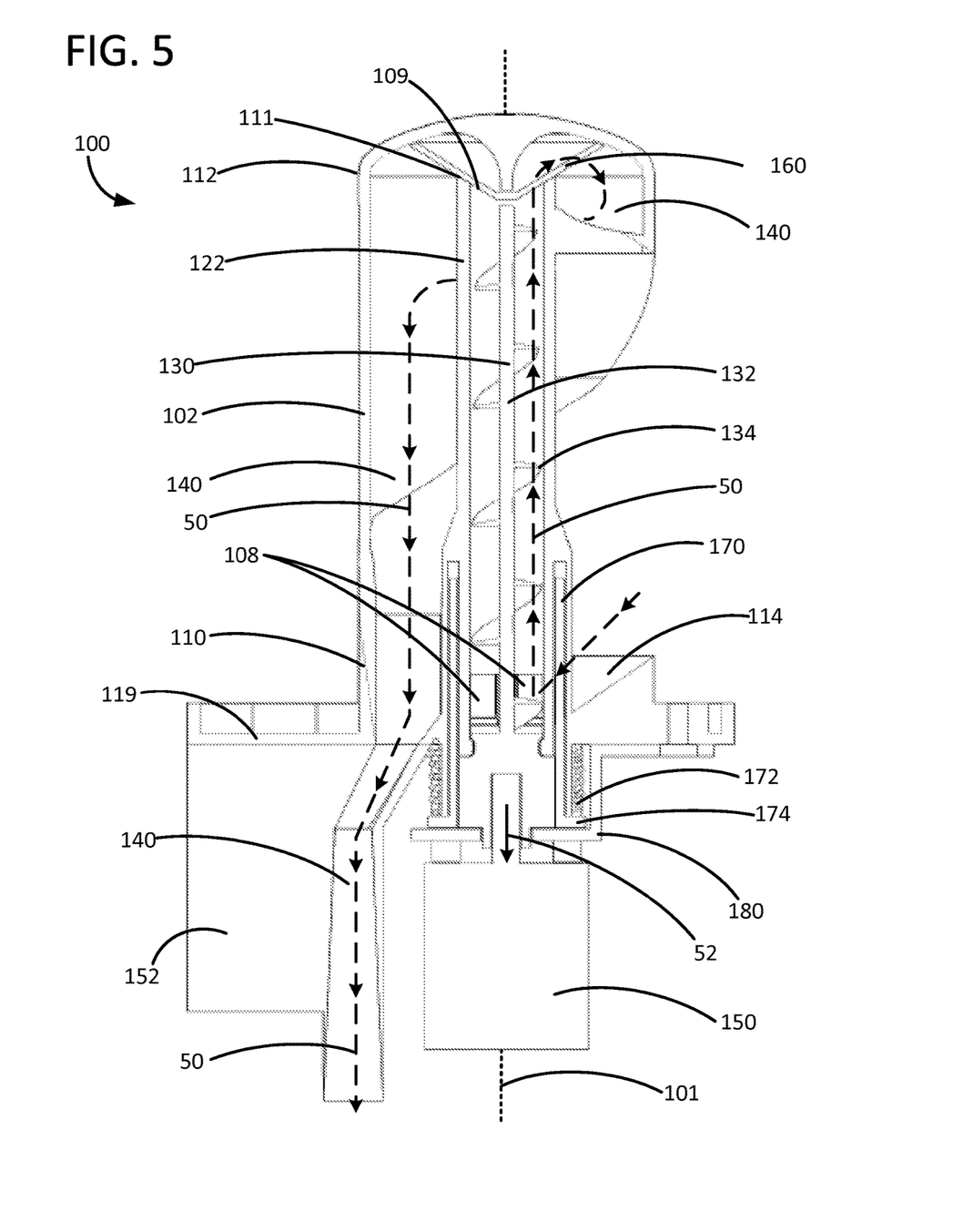
FIG. 5 is a cross-sectional view of the exemplary metering apparatus of FIG. 1-4.
Figure 6:
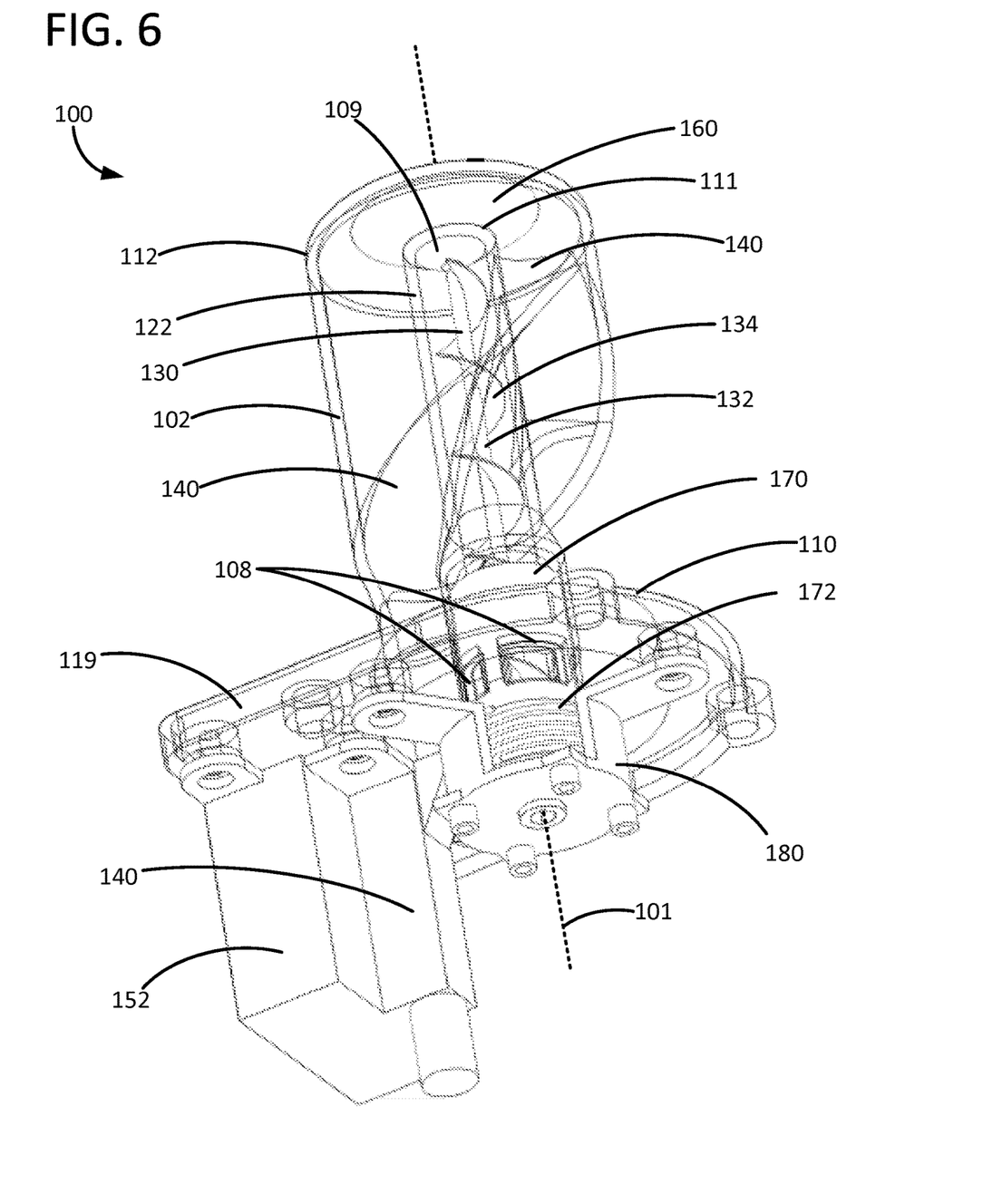
FIG. 6 is a partially-translucent, bottom-perspective view of the exemplary metering apparatus of FIGS. 1-5.
Figure 7:
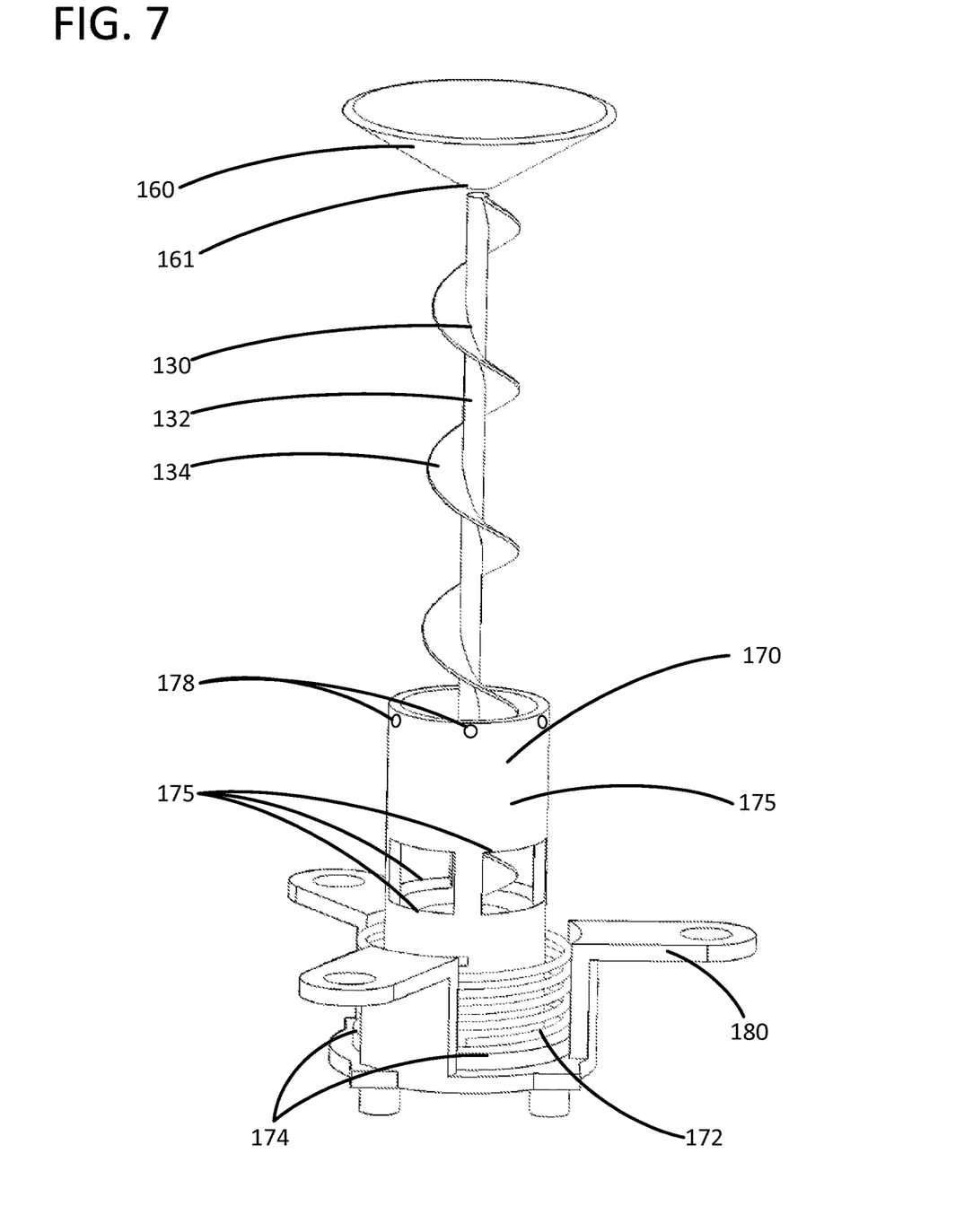
FIG. 7 is a perspective view of a restriction portion, an auger portion, a gate portion, and a bracket portion of the exemplary metering apparatus of FIGS. 1-6.

The housing portion 102 may define one or more interior spaces such as, e.g., an elevator channel 120 and discharge chute 140 as shown in FIGS. 5-6, which will be described further herein. Generally, the interior spaces of the housing portion 102 may define a channel, passageway, or conduit, for moving material from the interior cavity 26 of the reservoir 14 to outside of the reservoir 14, e.g., to dispensing apparatus.

To receive material from the interior cavity 26 of the reservoir 14, the housing portion 102 may define one or more intake openings 108 that extend into the interior spaces of the housing portion 102. The intake openings 108 may be located, or defined within, the lower region 110 of the housing portion 102 near the reservoir opening 25. The sloped, pyramidal design of the lower region 22 of the reservoir may be configured to direct material to the reservoir opening 25, and thus, may also be configured to direct material to the intake openings 108 of the housing portion 102 (e.g., since the intake openings 108 of the housing portion 102 are located proximate the reservoir opening 25).

Figure 2:
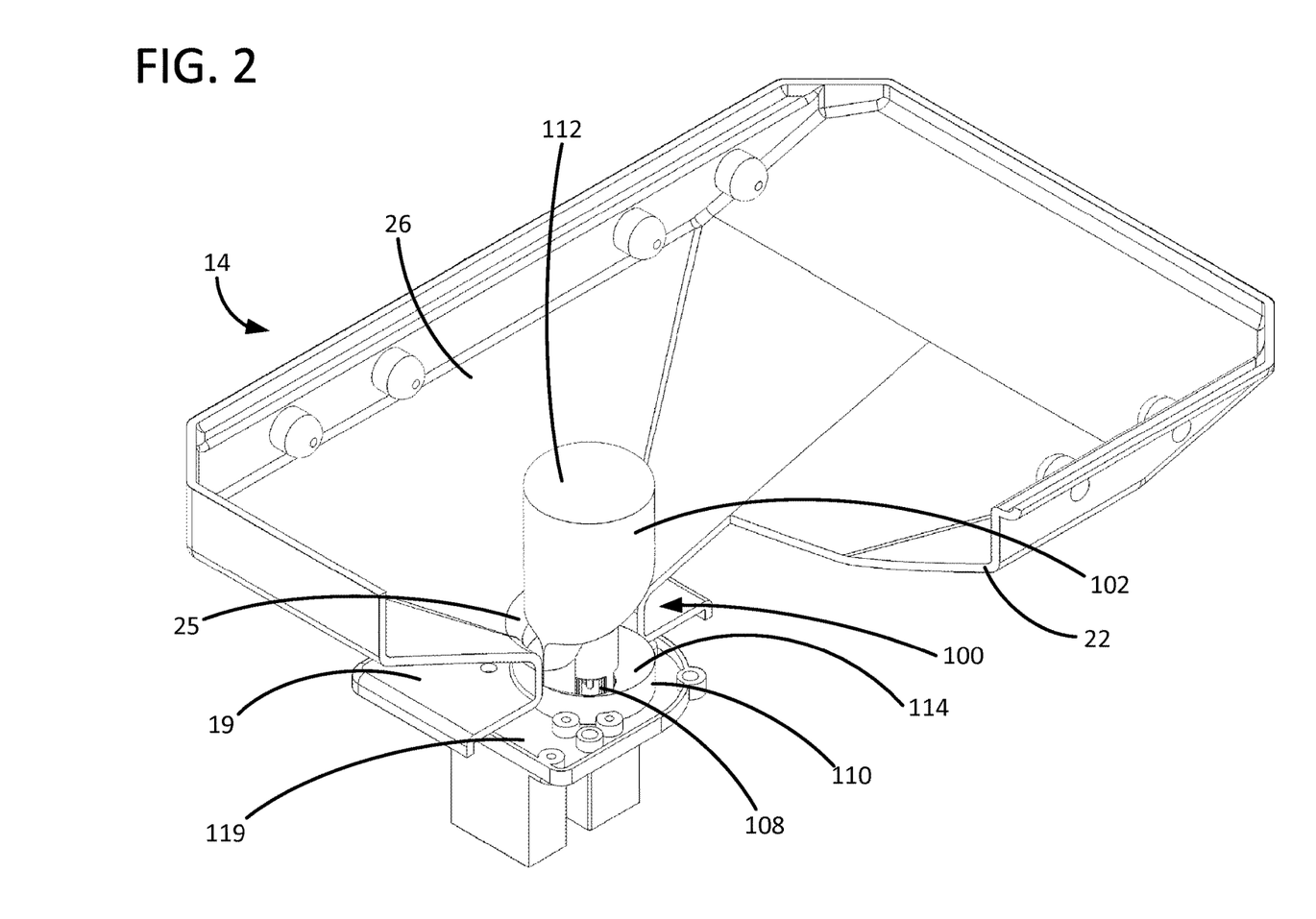
FIG. 2 is a perspective, cutaway view of a portion of the exemplary reservoir and the exemplary metering apparatus of the material transfer system of FIG. 1.

To further direct the material into the intake openings 108, the housing portion 102 may include a funnel region, or conical intake, 114 to receive material from the interior cavity 26 of the reservoir 14 as shown in FIG. 2. For example, gravity may pull, or apply a force to, the material towards the bottom of interior cavity 26 of the reservoir 14 to the reservoir opening 25, into the funnel region 114, and into the intake openings 108 defined by the housing portion 102.

Figure 3:
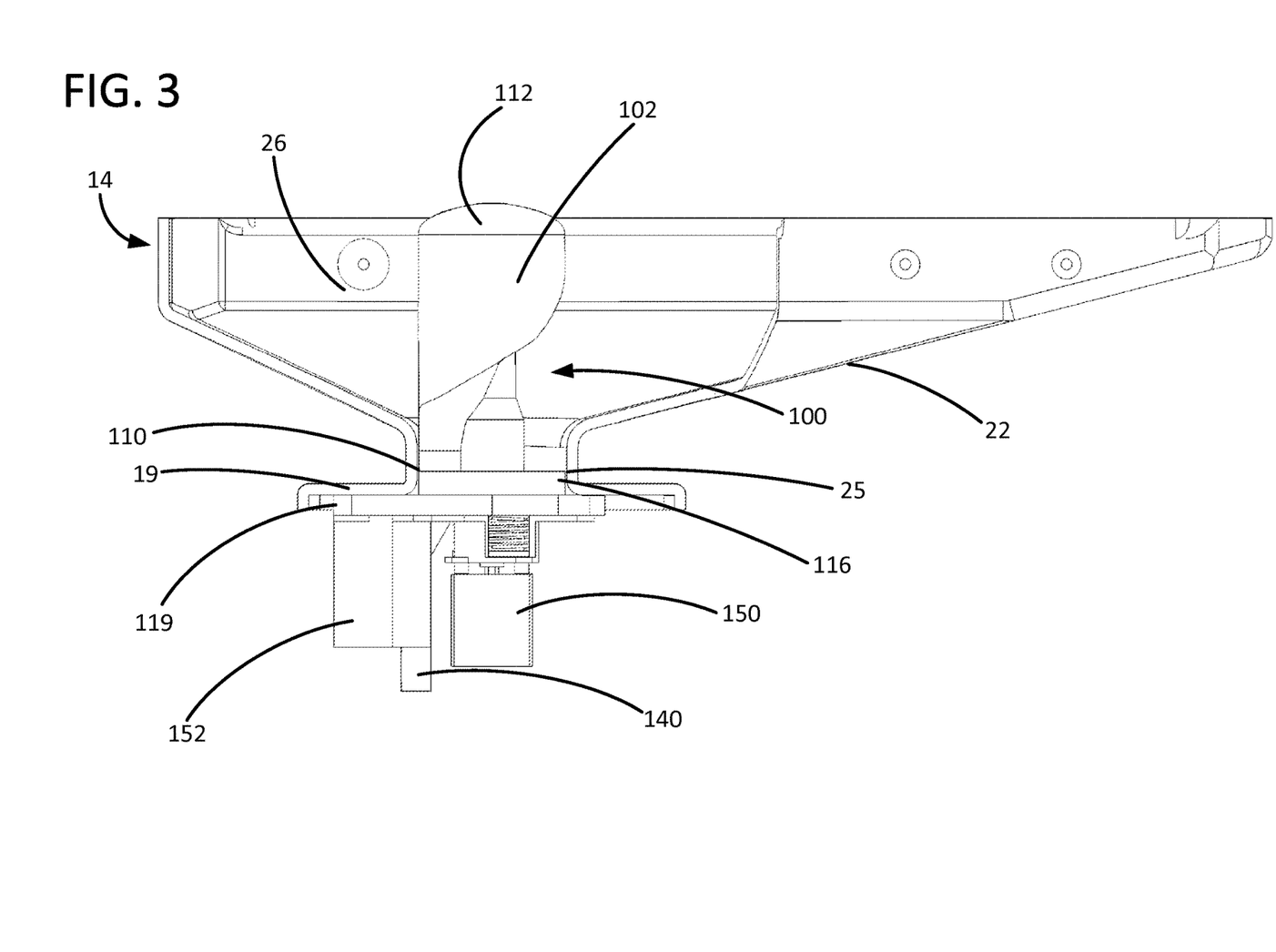
FIG. 3 is a side view, cutaway of the portion of the exemplary reservoir and the exemplary metering apparatus of the material transfer system of FIG. 1.

The lower region 110 of the housing portion 102 may define a circular portion 116 as shown in FIG. 3 proximate (e.g., about, around, etc.) the funnel region 114 that fits within the reservoir opening 25 to, e.g., plug or block material from moving through the reservoir opening 25 without moving through the metering apparatus 100. In other words, the circular portion 116 may be sized (e.g., the circumference of the circular portion 116) to "fit" within the reservoir opening 25 to inhibit material from exiting through reservoir opening 25. In other words, the metering apparatus 100 may be described as "plugging" the reservoir opening 25 such that no material may exit, or be discharged, from the reservoir 14 without being metered by the metering apparatus 100.

Further, as shown, the reservoir 14 may include a reservoir flange 19 proximate the reservoir opening 25 configured to be coupled to the metering apparatus 100. Likewise, the housing portion 102 of the metering apparatus 100 may include a housing flange 119 configured to be coupled to the reservoir flange 19. The housing flange 119 may be part of, or a portion of, the lower end region 110 of the housing portion 102. As shown, each of the reservoir flange 19 and the housing flange 119 of the housing portion 102 define attachment features such as, e.g., apertures, holes, etc. configured for use with attachment apparatus such as, e.g., screws, bolts, pins, etc.

As used herein, the metering apparatus 100 may be described as being able to "meter" material flowing therethrough. It is to be understood that "metering" material may include controlling the flow rate of material (e.g., an amount per second, an amount per minute, an amount per hour, etc.) out of the reservoir 14 and through the metering apparatus 100. Further, the metering apparatus 100 may be configured to stop the flow of material out of the reservoir 14 (e.g., no material may flow out of the reservoir 14 when the flow of material is stopped by the metering apparatus 100). Still further, the "metering" of the metering apparatus 100 may be described having a relatively high degree of precision due to, e.g., the various portions and design of the metering apparatus 100. For example, the metering apparatus 100 may include a motor portion 150 (e.g., a stepper motor) operatively coupled to a computing apparatus 152 to meter, or control, the flow of material through the metering apparatus 100 as will be described further herein. Further, the "metering" may further include the monitoring of the amount of material being dispensed. To perform metering of the material, the metering apparatus 100 may further include a computing apparatus 152 and a motor portion 150, which will be described further herein.

The housing portion 102 may be generally described as enclosing one or more portions and interior spaces of the metering apparatus 100 and coupling one or portions of the metering apparatus 100 together. Further, as shown in FIGS. 1-3, various portions of the metering apparatus 100 may be located within the interior cavity 26 of the reservoir 14, and the housing portion 102 may shield, or seal, one or more portions and interior spaces of the metering apparatus 100 from the material located in the interior cavity 26 of the reservoir 14.

Figure 4:
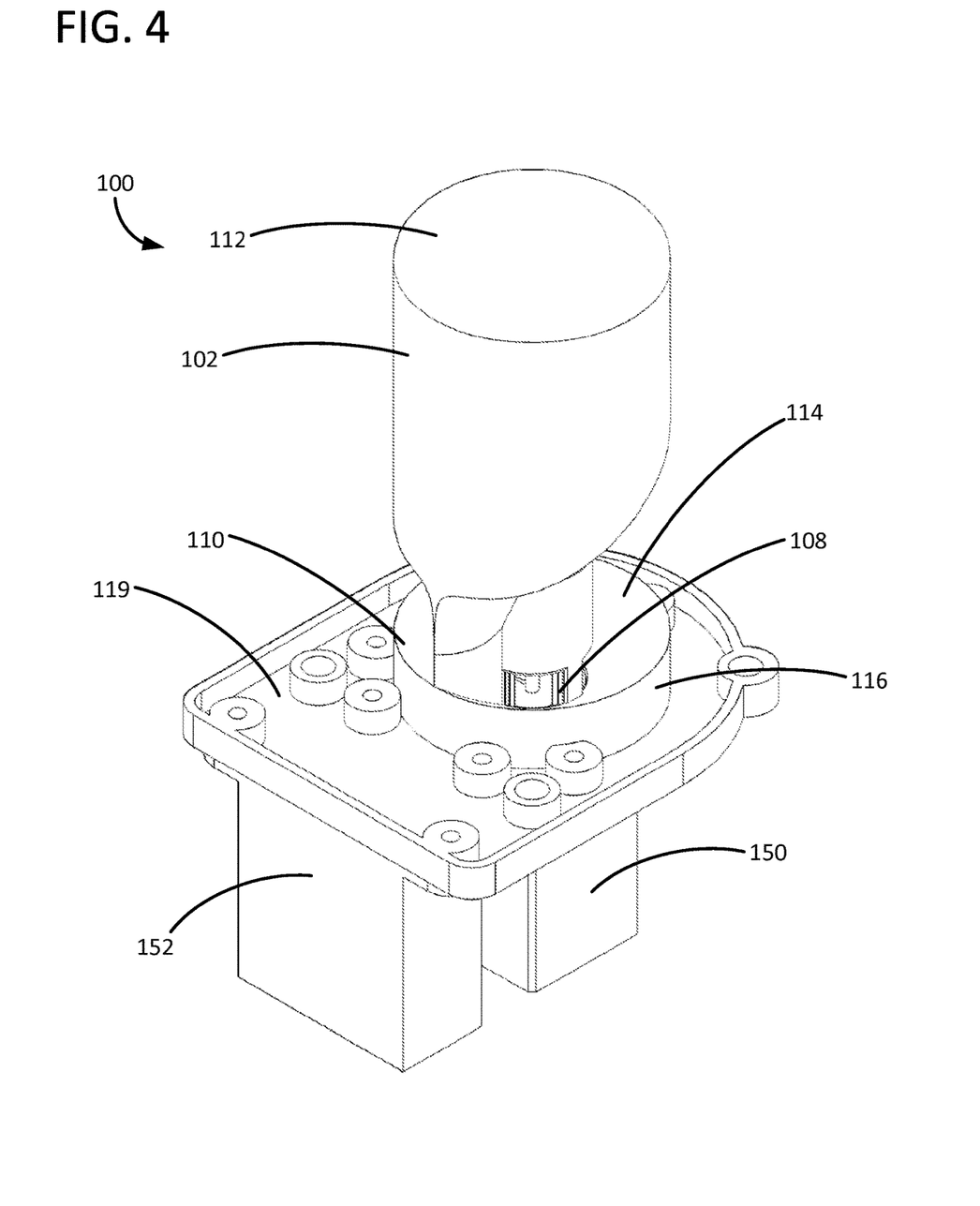
FIG. 4 is a perspective view of the exemplary metering apparatus of FIGS. 1-3.

As described herein, one interior space defined by the housing portion 102 is an elevator channel 120 extending from the one or more intake openings 108 (as shown in FIG. 4) to at least one discharge opening 109 (as shown in the cross-sectional view of FIG. 5). More specifically, the housing portion 102 may include an elevator channel wall 122 defining the elevator channel 120 (e.g., a cylindrical channel, passageway, or chute). The elevator channel 120 of the housing portion 102 may be the first interior space of the housing portion 102 wherein the material may be moved into from the intake openings 108. For example, the material located in the interior cavity 26 of the reservoir 14 may be directed (e.g., assisted by gravity) into the funnel region 114 of the housing portion 102 into the one or more intake opening 108 and into the elevator channel 120. The elevator channel 120 extends from the lower region 110 of the housing portion 102 to the upper region 112 of the housing portion 102 along an axis 101 as shown in FIGS. 5-6.

The metering apparatus 100 may further include an auger portion 130 (e.g., a screw-like shaft) located in the elevator channel 120 and configured to move material from the one or more intake openings 108 to the at least one discharge opening 109. The auger portion 130 may be described as a "screw conveyor" configured to convey, transport, or move, material along the length of the auger portion 130 through rotation thereof. The auger portion 130 may include a central shaft 132 and a helical portion 134 spiraling about the central shaft 132. A helix angle may be defined as the angle between the helical portion and the axis 101. The auger portion 130 may be configured such that the helix angle of the helical portion 134 configured effectively and/or efficiently move material through the elevator channel 120. Further, the helix angle may be selected based in part on the characteristics of the material to be metered and dispensed by the metering apparatus 100.

As shown, the auger portion 130 and the elevator channel 120 may be oriented along the axis 101 (e.g. vertically, along a vertical axis, etc.) such that the material may be moved upwardly by the helical portion 134 from the one or more intake openings 108 to the at least one discharge opening 109 when the auger portion 130 is rotated (e.g., rotated clockwise as shown). The elevator channel 120 may define a diameter perpendicular to the axis 101 (e.g., the diameter of the elevator channel 120 may be defined by the elevator channel wall 122) and the auger portion 130 (e.g., the helical portion 134) may also define a diameter perpendicular to the axis 101. The diameters of the elevator channel 120 and the auger portion 130 may be sized so as to provide a relatively tight, or snug, fit between each other such, e.g., that material may not move between the auger portion 130 and the elevator channel wall 122 of the elevator channel 120. In other words, each of the auger portion 130 and the elevator channel 120 may be made with a relatively low tolerance to provide a "close" fit therebetween. For example, in at least one embodiment, the space between the auger portion 130 and the inner wall of the elevator channel 120 may be smaller than a grain of the material to be transferred and/or metered.

Thus, when the auger portion 130 is rotated about the axis 101, material may be moved by the helical portion 134 along the auger portion 130 and elevator channel 120 from the lower region 110 to the upper region 112 of the housing 102 to a discharge opening 109. The discharge opening 109 may be described as the end, or opening at the end, of the elevator channel 120 proximate the upper region 112 of the housing portion 102. The housing 102 further defines a discharge chute 140 extending from the upper region 112 to the lower region 110 to discharge, or direct, material from the discharge opening 109 to outside of the housing 102 (and, therefore, the reservoir 114) to, e.g., dispensing apparatus. After material is discharged from the discharge opening 109, the material may be located in the discharge chute 140 and assisted by gravity (e.g., and assisted by vibrations, additional material moving into the discharge chute 140 from the elevator channel 120, etc.) to travel, or move, through (e.g., along, down, etc.) the discharge chute 140 to be discharged, or transferred, outside of the interior cavity 26 of the reservoir 14 to another apparatus such as, e.g., dispensing apparatus. In this example, the discharge chute 149 spirals around the elevator chute wall 122 of housing portion 102 that defines the elevator channel 120 and extends beyond the reservoir opening 25 of the reservoir 14. As shown in FIG. 5, the flow of the material is depicted with a broken line 50 with arrows indicating the direction of the flow.

The motor portion 150 as shown in FIG. 5 may be configured to rotate the auger portion 130 about the axis 101. For example, the motor portion 150 may include a shaft that is coupled to the auger portion 130. The shaft of the motor portion 150 may be rotated by the moor portion 150, which may, in turn, rotate the auger portion 130 coupled thereto. As described, the rotation of the auger portion 130 may move the material along the elevator channel 120 from the lower region 110 to the upper region 112 of the housing portion 102 (e.g., upwardly away from the lower region 110 of the housing portion 102) to the discharge opening 109. The motor portion 150 may be an electric stepper motor. The computing apparatus 152 may be configured to control the motor portion 150 to, e.g., selectively control the flow rate of the material through the metering apparatus 100 and monitor the amount of material flowing through the metering apparatus 100 (e.g., the computing apparatus 152 may monitor the rotations of the auger portion 130 by the motor 150 to determine how much material is flowing through the metering apparatus 100, the computing apparatus 152 may include or be operatively coupled to sensors to determine the amount of material flowing through the discharge chute 140, etc.). Further, the computing apparatus 152 may be configured to receive locational information (e.g., global positioning data, etc.) to select the flow rate of material for a particular area of a field. In other words, the computing apparatus 152 may select a flow rate based on, or in response to, the present location of the metering apparatus 100, dispensing apparatus, and/or implement. As the location changes, the computing apparatus 152 may change to the flow rate based on, or in response to, the location change. For example, some areas of a field may need more material (e.g., such as insecticide) than others, and as such, the computing apparatus 152 may increase the flow rate of material for the areas than need more material based on locational information. It is to be understood that this is merely one example and the computing apparatus 152 can control the flow rate of material through the metering apparatus based on multiple variables and/or factors.

The exemplary metering apparatus 100 may further include a restriction portion 160 configured to inhibit flow of material from the elevator channel 120 through the at least on discharge opening 109 to the discharge chute 140 when the auger portion 130 is stationary and to allow flow of material from the elevator channel 120 through the at least on discharge opening 109 to the discharge chute 140 when the auger portion 130 is rotated to move material from the one or more intake openings 108 to the at least one discharge opening 109 to be discharged through the discharge chute 140. As shown, the restriction portion 160 may be a conical portion (e.g., rubber, polymer, etc.) defining a point 161 located in the discharge opening 109 into a portion of the elevator channel 120 (e.g., "point down") such that the edges 111 of the discharge opening 109 are contacted (e.g., sealed) by the restriction portion 160. The restriction portion 160 may be biased to be in contact with the edges 111 of the discharge opening 109 such that material may not be transferred from the elevator channel 120 into the discharge chute 140 unless the auger portion 130 is moving, or rotating, thereby pushing material against the restriction portion 160 to open (e.g., deflect the restriction portion 160, unseal the restriction portion 160 from the discharge opening 109, etc.) the restriction portion 160 to allow material to flow from the elevator channel 120 through the discharge opening into the discharge chute 140. More specifically, the restriction portion 160 may be biased towards the lower region 110 of the housing portion 102. Once the material is in the discharge chute 140, the material may flow through the discharge chute 140 (e.g., downwardly through the discharge chute 140 from the upper region 112 to the lower region 110 of the housing 102) out of the metering apparatus 100 (e.g., the material may be assisted by gravity). Further, the restriction portion 160 may be described as inhibiting flow of material when the auger portion 130 is stationary, or not moving/rotating, which, e.g., may create a seal such that material does not flow, or leak, out of the discharge chute 140, elevator channel 120, and/or reservoir 14 inadvertently and/or unintentionally.

The exemplary metering apparatus 100 may further include a gate portion 170 that may generally be described as being configured to allow flow of material into the elevator channel 120 through the one or more intake openings 108. The gate portion 170, however, may also be configured to restrict, or inhibit, flow when one or more portions of the metering apparatus 100 are disassembled or decoupled to restrict, or inhibit, material from unintentionally and/or inadvertently exit from the reservoir 14 during maintenance of the metering apparatus 100. As shown, the functionality of the gate portion 170 may be provided by a spring 172 acting on a gate flange 174 of the gate portion 170 and the housing flange 119 of the housing portion 102. The spring 172 biases the gate portion 170 in a direction 52 along the axis 101 such that when the motor portion 150 and bracket portion 180 are removed, or uncoupled, from the remainder of the metering apparatus 100 (e.g., for maintenance or service), the gate portion 170 may move away from the upper region 112 of the housing 102 (e.g., downwardly) such that the one or more intake openings 108 are closed (e.g., so that material cannot flow between the reservoir 14 and the elevator channel 120). Further, when the gate portion 170 moves away from the upper region 112 of the housing 102 (e.g., downwardly), one or more elements or features 178 (e.g., "buttons," bump stops, etc.) of the gate portion 170 may restrict movement of the gate portion 170 completely away and apart from the remainder of the metering apparatus 100.

In other words, the bracket portion 180 holds the gate portion 170 against the spring bias direction 52 such that the gate portion 170 does not inhibit flow of material through the one or more intake openings 108 of the housing portion 102. To allow flow of material through the one or more intake openings 108, the gate portion 170 may further define gate openings 185 that align, or "match up," with the intake openings 108 of the housing portion 102 when the bracket portion 180 is holding the gate portion 170 onto the housing portion 102 against the biasing direction 52. When the bracket portion 102 is removed, or uncoupled, from the housing portion 102, the spring 172 may act on the gate flange 174 moving the gate portion 170 in the biasing direction 52 thereby misaligning the gate openings 185 with the one or more intake openings 108 and instead blocking the one or more intake openings 108 with a wall, or seal, region 175 of the gate portion 170.

All patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the exemplary apparatus described herein. Various modifications of the illustrative embodiments, as well as additional embodiments of the disclosure, will be apparent upon reference to this description.

What is claimed is:

1. A metering apparatus for use with a reservoir holding material, the metering apparatus comprising:
    a housing portion comprising a lower region couplable to a reservoir and an upper region, wherein the housing portion defines:
        an elevator channel extending from one or more intake openings proximate the lower region to a discharge opening proximate the upper region, and
        a discharge chute configured to receive material from the discharge opening and to direct the material outside of the reservoir;
    an auger portion located within the elevator channel and configured to selectively move material from the one or more intake openings through the elevator channel to the discharge opening; and
    a motor apparatus operatively coupled to the auger portion and configured to rotate the auger portion to move material from the one or more intake openings through the elevator channel to the discharge opening to be discharged through the discharge chute,
    wherein the metering apparatus further comprises a restriction portion configured to inhibit flow of material from the elevator channel through the discharge opening to the discharge chute when the auger portion is stationary and to allow flow of material from the elevator channel through the discharge opening to the discharge chute when the auger portion is rotated to move material from the one or more intake openings to the discharge opening to be discharged through the discharge chute.

2. The apparatus of claim 1, wherein the restriction portion is biased towards the discharge opening to inhibit flow of material from the elevator channel through the discharge opening to the discharge chute when the auger portion is stationary.

3. The apparatus of claim 1, wherein the restriction portion is conical extending from a point, wherein the point of the restriction portion is located within the discharge opening proximate the auger portion.

4. The apparatus of claim 1, wherein the metering apparatus further comprises a gate portion configured to selectively inhibit flow of material from the reservoir through the one or more intake openings into the elevator channel.

5. The apparatus of claim 4, wherein the metering apparatus further comprises a bracket portion couplable to the lower region of the housing portion, wherein the gate portion inhibits flow of material from the reservoir through the one or more intake openings into the elevator channel when the bracket portion is removed from the lower region of the housing portion, wherein the gate portion allows flow of material from the reservoir through the one or more intake openings into the elevator channel when the bracket portion is coupled to the lower region of the housing portion.

6. The apparatus of claim 4, wherein the gate portion is biased away from the upper region of the housing.

7. The apparatus of claim 1, wherein the housing portion is configured to locate the discharge opening and the one or more intake openings inside the reservoir when the lower region of the housing portion is coupled to the reservoir.

8. The apparatus of claim 1, wherein the motor apparatus is configured to be located outside of the reservoir when the lower region of the housing portion is coupled to the reservoir.

9. The apparatus of claim 1, wherein the motor apparatus is configured to selectively control the rate of flow of material from the reservoir to be discharged through the discharge chute.

10. The apparatus of claim 9, wherein the metering apparatus further comprises computing apparatus operably coupled to the motor apparatus to control the rate of flow of material from the reservoir to be discharged through the discharge chute.

11. The apparatus of claim 1, wherein the elevator channel and the auger portion are aligned along an axis.

12. The apparatus of claim 1, wherein the housing portion further comprises a funnel region configured to direct material form the reservoir into the one or more intake openings.

13. A material transfer system comprising:
a reservoir defining an interior cavity configured to hold material and a reservoir opening extending into the interior cavity; and
a metering apparatus at least partially positionable within the reservoir opening and configured to control the flow of material from the reservoir and comprising:
a housing portion comprising a lower region couplable to the reservoir and an upper region, wherein the housing portion defines:
an elevator channel extending from at least one intake opening proximate the lower region to a discharge opening proximate the upper region, and
a discharge chute configured to receive material from the discharge opening and to direct the material outside of the interior cavity of the reservoir;
an auger portion located within the elevator channel and configured to move material from the at least one intake opening through the elevator channel to the discharge opening; and
a restriction portion configured to inhibit flow of material from the elevator channel through the discharge opening to the discharge chute when the auger portion is stationary and to allow flow of material from the elevator channel through the discharge opening to the discharge chute when the auger portion is rotated to move material from the at least one intake opening to the discharge opening to be discharged through the discharge chute.

14. The system of claim 13, wherein the metering apparatus further comprises a gate portion configured to selectively inhibit flow of material from the interior cavity of the reservoir through the at least one intake opening into the elevator channel.

15. The system of claim 13, wherein the housing portion is configured to locate the discharge opening and the at least one intake opening inside the reservoir when the lower region of the housing portion is coupled to the reservoir.

16. The system of claim 13, wherein the metering apparatus further comprises a motor apparatus operatively coupled to the auger portion and configured to rotate the auger portion to move material from the at least one intake opening through the elevator channel to the discharge opening to be discharged through the discharge chute.

17. The system of claim 16, wherein the motor apparatus is configured to selectively control the rate of flow of material from the reservoir to be discharged through the discharge chute.

18. The system of claim 17, wherein the metering apparatus further comprises computing apparatus operably coupled to the motor apparatus to control the rate of flow of material from the interior cavity of the reservoir to be discharged through the discharge chute.

19. A metering apparatus for use with a reservoir holding material, the metering apparatus comprising:
a housing portion comprising a lower region couplable to a reservoir and an upper region, wherein the housing portion defines:
an elevator channel extending from one or more intake openings proximate the lower region to a discharge opening proximate the upper region, and
a discharge chute configured to receive material from the discharge opening and to direct the material outside of the reservoir;
an auger portion located within the elevator channel and configured to selectively move material from the one or more intake openings through the elevator channel to the discharge opening; and
a motor apparatus operatively coupled to the auger portion and configured to rotate the auger portion to move material from the one or more intake openings through the elevator channel to the discharge opening to be discharged through the discharge chute,
wherein the metering apparatus further comprises a gate portion configured to selectively inhibit flow of material from the reservoir through the one or more intake openings into the elevator channel.

20. The apparatus of claim 19, wherein the metering apparatus further comprises a restriction portion configured to inhibit flow of material from the elevator channel through the discharge opening to the discharge chute when the auger portion is stationary and to allow flow of material from the elevator channel through the discharge opening to the discharge chute when the auger portion is rotated to move material from the one or more intake openings to the discharge opening to be discharged through the discharge chute.

21. The apparatus of claim 19, wherein the housing portion is configured to locate the discharge opening and the one or more intake openings inside the reservoir when the lower region of the housing portion is coupled to the reservoir.

22. The apparatus of claim 19, wherein the motor apparatus is configured to be located outside of the reservoir when the lower region of the housing portion is coupled to the reservoir.

23. The apparatus of claim 19, wherein the motor apparatus is configured to selectively control the rate of flow of material from the reservoir to be discharged through the discharge chute.

24. The apparatus of claim 19, wherein the elevator channel and the auger portion are aligned along an axis.

25. The apparatus of claim 19, wherein the housing portion further comprises a funnel region configured to direct material form the reservoir into the one or more intake openings.

26. A metering apparatus for use with a reservoir holding material, the metering apparatus comprising:
- a housing portion comprising a lower region couplable to a reservoir and an upper region, wherein the housing portion defines:
  - an elevator channel extending from one or more intake openings proximate the lower region to a discharge opening proximate the upper region, and
  - a discharge chute configured to receive material from the discharge opening and to direct the material outside of the reservoir;
- an auger portion located within the elevator channel and configured to selectively move material from the one or more intake openings through the elevator channel to the discharge opening; and
- a motor apparatus operatively coupled to the auger portion and configured to rotate the auger portion to move material from the one or more intake openings through the elevator channel to the discharge opening to be discharged through the discharge chute,
- wherein the housing portion further comprises a funnel region configured to direct material form the reservoir into the one or more intake openings.

27. The apparatus of claim 26, wherein the metering apparatus further comprises a restriction portion configured to inhibit flow of material from the elevator channel through the discharge opening to the discharge chute when the auger portion is stationary and to allow flow of material from the elevator channel through the discharge opening to the discharge chute when the auger portion is rotated to move material from the one or more intake openings to the discharge opening to be discharged through the discharge chute.

28. The apparatus of claim 26, wherein the metering apparatus further comprises a gate portion configured to selectively inhibit flow of material from the reservoir through the one or more intake openings into the elevator channel.

29. The apparatus of claim 26, wherein the housing portion is configured to locate the discharge opening and the one or more intake openings inside the reservoir when the lower region of the housing portion is coupled to the reservoir.

30. The apparatus of claim 26, wherein the motor apparatus is configured to be located outside of the reservoir when the lower region of the housing portion is coupled to the reservoir.

31. The apparatus of claim 26, wherein the motor apparatus is configured to selectively control the rate of flow of material from the reservoir to be discharged through the discharge chute.

32. The apparatus of claim 26, wherein the elevator channel and the auger portion are aligned along an axis.

33. A material transfer system comprising:
- a reservoir defining an interior cavity configured to hold material and a reservoir opening extending into the interior cavity; and
- a metering apparatus at least partially positionable within the reservoir opening and configured to control the flow of material from the reservoir and comprising:
  - a housing portion comprising a lower region couplable to the reservoir and an upper region, wherein the housing portion defines:
    - an elevator channel extending from at least one intake opening proximate the lower region to a discharge opening proximate the upper region, and
    - a discharge chute configured to receive material from the discharge opening and to direct the material outside of the interior cavity of the reservoir;
  - an auger portion located within the elevator channel and configured to move material from the at least one intake opening through the elevator channel to the discharge opening; and
  - a gate portion configured to selectively inhibit flow of material from the interior cavity of the reservoir through the at least one intake opening into the elevator channel.

* * * * *